(12) United States Patent
Welch

(10) Patent No.: US 7,403,743 B2
(45) Date of Patent: Jul. 22, 2008

(54) SYSTEM AND METHOD TO UNLOCK HIDDEN MULTIMEDIA CONTENT

(75) Inventor: Michael Shannon Welch, Raleigh, NC (US)

(73) Assignee: Sony Ericsson Mobile Communications AB (SE)

(*) Notice: Subject to any disclaimer, the term of this patent is extended or adjusted under 35 U.S.C. 154(b) by 610 days.

(21) Appl. No.: 11/026,982

(22) Filed: Dec. 31, 2004

(65) Prior Publication Data
US 2006/0148454 A1    Jul. 6, 2006

(51) Int. Cl.
H04B 5/00    (2006.01)
H04M 3/00    (2006.01)
H04Q 5/22    (2006.01)

(52) U.S. Cl. .............. 455/41.1; 455/41.2; 455/41.3; 455/420; 340/10.1; 340/10.5; 340/10.51

(58) Field of Classification Search ............ 455/41.1, 455/41.2, 41.3, 557, 558, 418, 419, 420; 340/10.1, 10.4, 10.51, 10.5

See application file for complete search history.

(56) References Cited

U.S. PATENT DOCUMENTS

| | | | |
|---|---|---|---|
| 5,911,121 A | | 6/1999 | Andrews |
| 6,415,144 B1 * | | 7/2002 | Findikli et al. ............ 455/419 |
| 6,466,804 B1 * | | 10/2002 | Pecen et al. ............ 455/558 |
| 6,859,650 B1 * | | 2/2005 | Ritter ............ 455/406 |
| 6,912,398 B1 * | | 6/2005 | Domnitz ............ 455/461 |
| 7,043,456 B2 * | | 5/2006 | Lindskog et al. ............ 705/76 |
| 2002/0147029 A1 * | | 10/2002 | Wu ............ 455/558 |
| 2003/0135748 A1 * | | 7/2003 | Yamada et al. ............ 713/193 |
| 2003/0220876 A1 * | | 11/2003 | Burger et al. ............ 705/50 |
| 2004/0176032 A1 * | | 9/2004 | Kotola et al. ............ 455/41.2 |
| 2005/0026643 A1 * | | 2/2005 | White et al. ............ 455/550.1 |
| 2005/0125677 A1 * | | 6/2005 | Michaelides ............ 713/185 |
| 2006/0119471 A1 * | | 6/2006 | Rudolph et al. ............ 340/10.41 |

FOREIGN PATENT DOCUMENTS

EP    1324576    7/2003
WO    WO 02/093881    11/2002

OTHER PUBLICATIONS

PCT International Search Report, International Application No. PCT/US2005/024702, mailed Nov. 4, 2005.

* cited by examiner

*Primary Examiner*—Duc M Nguyen
(74) *Attorney, Agent, or Firm*—Coats & Bennett, P.L.L.C.

(57) ABSTRACT

A consumer electronics device comprises an interrogator and a tag is associated with an accessory for the wireless communications device. The tag stores an identifier that identifies hidden multimedia content stored in memory of the wireless communications device. When the consumer electronics device and the accessory are in close proximity to each other, the interrogator activates the tag for the identifier. A content manager disposed in the consumer electronics device unlocks the hidden multimedia content based on the received identifier.

28 Claims, 8 Drawing Sheets

SYSTEM AND METHOD TO UNLOCK HIDDEN MULTIMEDIA CONTENT

BACKGROUND

The present invention relates generally to wireless communications devices, and more particularly to wireless communications devices having hidden multimedia content stored in memory.

Wireless communications devices come in many different models. Each model is typically configured to render a variety of multimedia content to a user, and is able to mate with a wide array of accessories. For example, many devices come preprogrammed from the manufacturer with polyphonic ring tones, images, or video, and are compatible with various covers, headsets, and other peripheral devices. Further, many manufacturers and/or third party vendors also offer additional multimedia content and accessory devices that users may purchase after the initial purchase of the wireless communications device. While such variety is beneficial, it is often difficult for any particular manufacturer to differentiate its own products from its competitors' products. Accordingly, there is a need for a system and method that will help manufacturers differentiate their products in the marketplace.

SUMMARY

The present invention provides a system and method that unlocks multimedia content stored on a consumer electronics device and is hidden from a user. Whether the hidden multimedia content is unlocked is based upon an identifier associated with an accessory device associated with the consumer device. The consumer device may be, for example, a wireless communications device. The accessory may be, for example, a cover, a charger, or a hands-free headset that is used with the wireless communications device.

The consumer electronics device comprises an interrogator and a content manager. The accessory is associated with a tag that is integrated with or attached to the accessory. Circuitry on the tag stores an identifier that uniquely identifies hidden multimedia content stored on a users device. The hidden multimedia content may include hidden commands, settings, profiles, applications, games, backlighting effects, links to web sites, and the like. The interrogator includes circuitry that emits a signal that activates the tag circuitry when the consumer electronics device and the accessory are brought within close proximity of each other. Responsive to the emitted signal, the tag activates its circuitry to permit the interrogator to acquire its stored identifier. The interrogator then passes the identifier to the content manager. The content manager verifies the identifier to determine whether it is valid, and unlocks the hidden multimedia content based on the valid identifier.

In one embodiment, a single identifier on the tag identifies a single instance of the hidden multimedia content, for example, a game. In other embodiments, the single identifier identifies a plurality of hidden multimedia content, for example, a game, a screen saver application, and a ring tone. In still other embodiments, the tag may include a plurality of identifiers, each of which identify one or more hidden multimedia content stored in memory on the consumer electronics device.

The content manager prevents users from activating the hidden multimedia content, until it determines that the identifier received from the tag is valid. To determine the validity of the identifier, the content manager may compare the identifier received from the tag with one or more identifiers stored in memory of the consumer device. Alternatively, the content manager may send the identifier to a backend system via a communications network for validation. However, validation is accomplished, the content manager unlocks the identified hidden multimedia content when it determines that the identifier is valid. Once the content is unlocked, the user is free to enjoy the multimedia content regardless of the presence of the tag.

DETAILED DESCRIPTION

Figure 1:
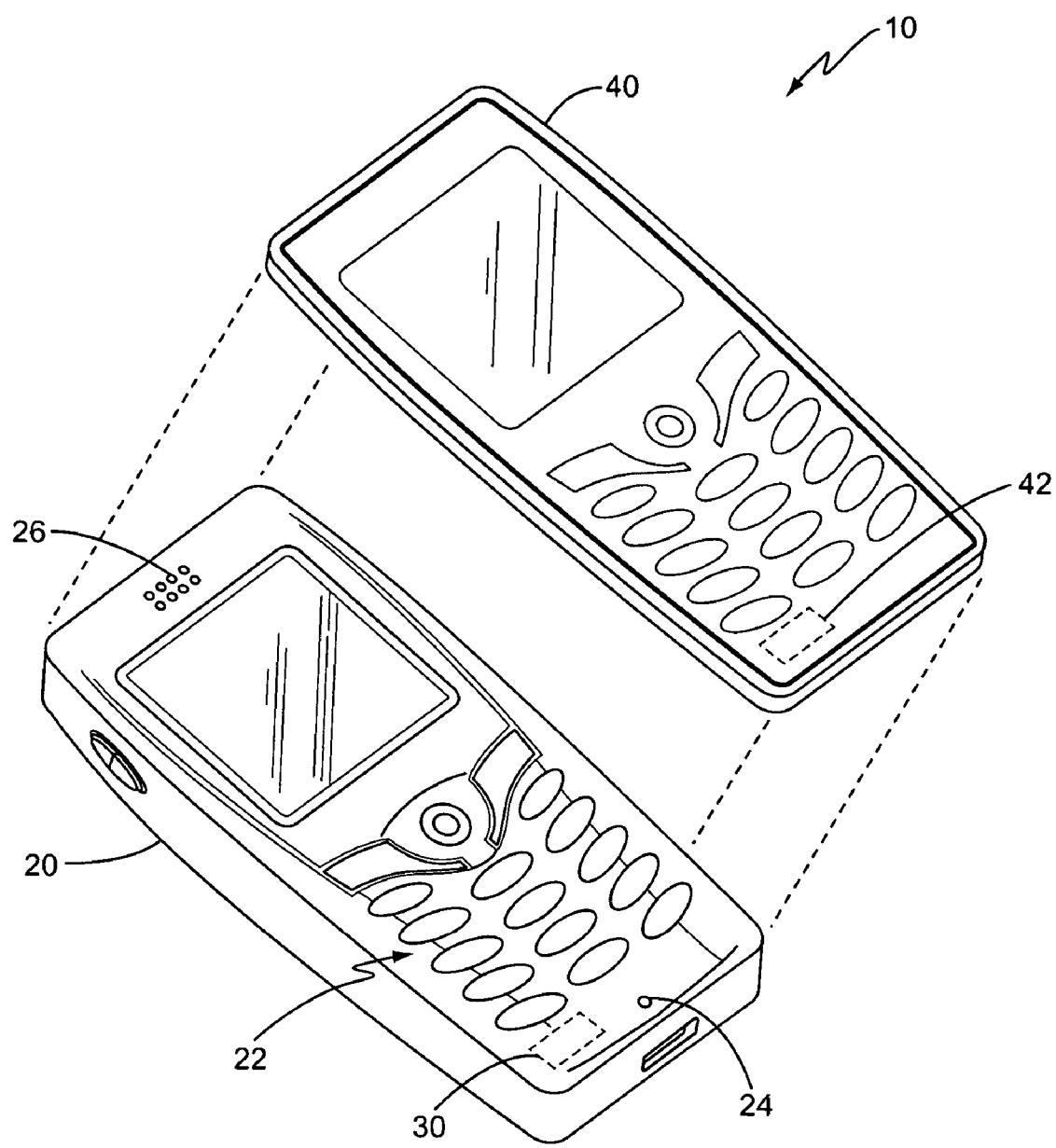
FIG. 1 illustrates a block diagram showing a wireless communications device configured according to one embodiment of the present invention.
Figure 2:
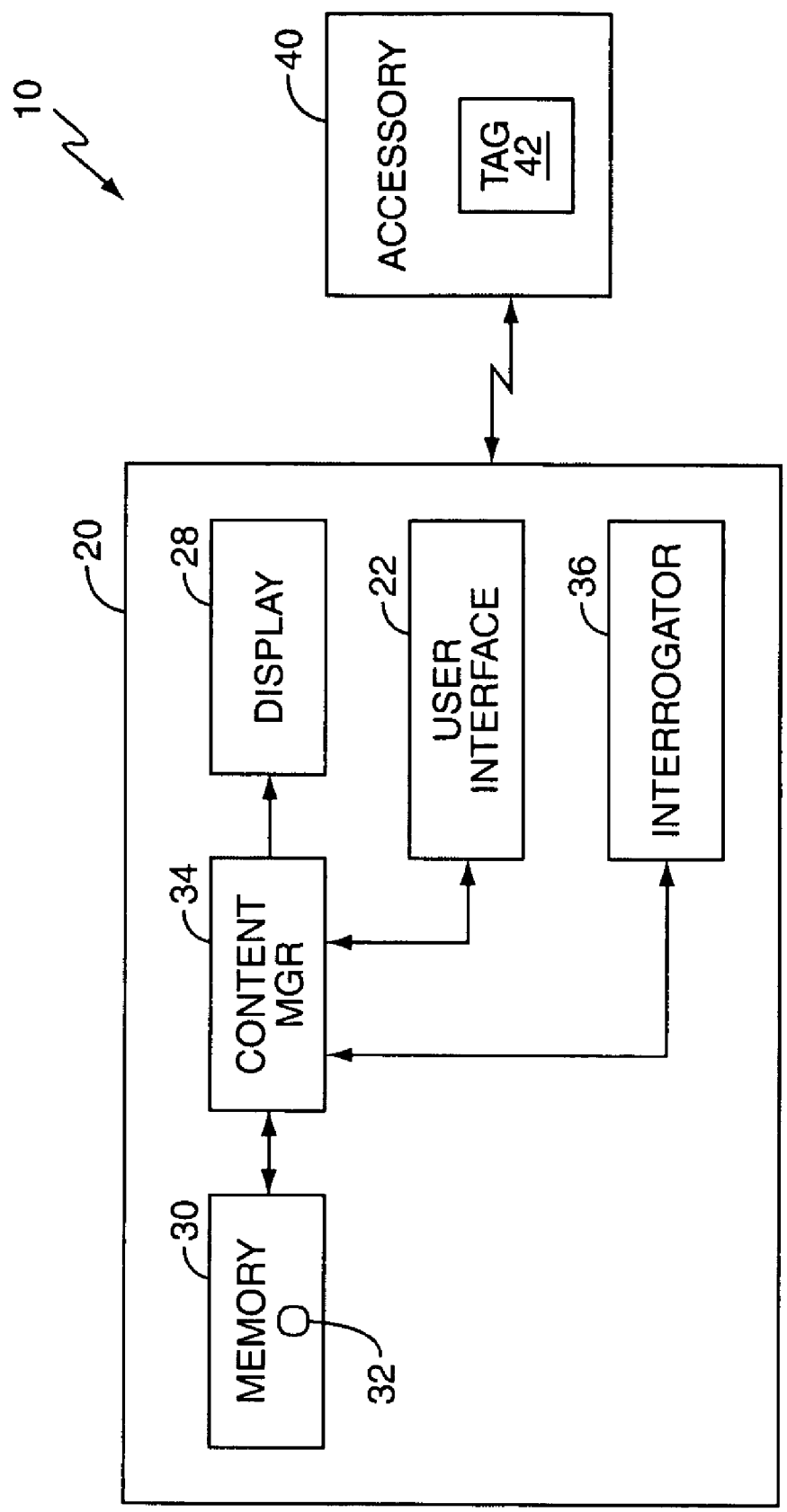
FIG. 2 illustrates a perspective view of a wireless communications device and associated accessory according to one embodiment of the present invention.

Referring now to FIGS. 1 and 2, a system configured according to one embodiment of the present invention is shown therein and indicated generally by the number 10. As seen in FIGS. 1 and 2, system 10 comprises a wireless communications device 20 and an accessory 40. FIG. 1 shows wireless communications device 10 and accessory 40 as a cellular telephone and a cover, respectively. However, those skilled in the art will appreciate that the present invention is not limited solely to cellular telephones, but is applicable to any consumer electronics device with or without communications capabilities including, but not limited to, Personal Digital Assistants (PDA), palm or laptop computers, satellite phones, and the like. Likewise, the present invention is not limited only to covers as accessories, but may include any accessory capable of being used or associated with wireless communications device 20.

Wireless communications device 20 comprises a user interface 22, microphone 24, speaker 26, a content manager 34, a display 28, memory 30 for storing hidden multimedia content 32, and an interrogator 36. Wireless communications device 20 may also include other components as is known in the art. User interface 22 is disposed on a face of wireless communications device 20, and includes an alphanumeric keypad and other input controls such as a joystick, button controls, or dials that allow the operator to dial numbers, enter commands, and select options from menu systems. Microphone 24 converts the user's speech into electrical audio signals, and speaker 26 converts audio signals into audible sounds that can be heard by the user.

Display 28 displays graphical interfaces to the user and permits users to view dialed digits, call status, menu options, and other service information. The graphical interfaces may include icons, menus, messages that prompt the user to input information, and other symbols and/or text as needed or desired. Memory 30 represents the entire hierarchy of memory in wireless communications device 20, and may include both random access memory and read-only memory. Computer program instructions and data required for the operation of wireless communications device 20 are stored in non-volatile memory, and may be implemented as discrete devices, stacked devices, or integrated with a controller (not shown).

Hidden multimedia content 32 represents one or more digital files stored in memory 30. Hidden multimedia content 32 may be for example, audio files that are used to render audible sound, video or image files for display to the user, various commands and/or actions that the user may invoke, settings, profiles, application programs, games, links to web sites, display and/or keypad backlighting schemes, and the like. These files may be stored in memory 30 during manufacture, or may be received or downloaded via a communications network. Hidden multimedia content 32 remains "hidden" from the user (i.e., inactive in memory) until content manager 34 unlocks the content for rendering to the user. Thus, the user may or may not be aware of the presence of hidden multimedia content 32 in memory 30.

Content manager 34 may be one or more control functions implemented in a single controller, or in multiple controllers, and interfaces with display 28, memory 30, and interrogator 36. Suitable controllers may include both general purpose and special purpose controllers or microprocessors. Content manager 34 is responsible for managing the storage, activation, and operation of hidden multimedia content 32 in wireless communications device 20. In one embodiment, for example, content manager 34 has access to information stored in cache or in memory 30 that identifies hidden multimedia content 32 and the memory address or addresses where hidden multimedia content 32 is stored. Content manager 34 is configured to prevent the user from activating hidden multimedia content 32 (i.e., lock the hidden multimedia content 32), and to generate one or more control signals to unlock or activate the hidden multimedia content 32 based on the validation of one or more identifiers received from interrogator 36. Once the hidden multimedia content 32 is unlocked, content manager 34 may generate control signals to render hidden multimedia content 32 for the user on display 28 and/or speaker 26, or place the hidden multimedia content 32 in an area of memory 30 such that the user may freely access and/or use the content thereafter.

Interrogator 36 may be any circuit capable of activating tag 42 of accessory 40, and reading or receiving a unique identifier from tag 42 responsive to the activation. Once the identifier is retrieved, interrogator 36 sends the identifier to content manager 34 for validation. Typically, interrogator 36 is integrated within the housing of wireless communications device 20; however, this is not required. Interrogator 36 may be a separate component that connects to wireless communications device 20 via a system interface or other like port (not shown).

In one embodiment of the present invention, interrogator 36 and tag 42 comprise a Radio Frequency Identification (RFID) system. For details regarding RFID technology, the interested reader may refer to the RFID standards document ANSI INCITS 256-2001 published by the American National Standards Institute (ANSI), which is herein incorporated by reference. Briefly, RFID is a method of remotely storing and retrieving data over a specified radio frequency. An RFID transceiver, such as interrogator 30, comprises an antenna, a transceiver, and a decoder. RFID transceivers emit a signal that activates an RFID tag so it can read and write data to it. An RFID tag, such as tag 42, is a small object that can be attached to or incorporated into a product, such as accessory 40. RFID tags also contain antennae to enable them to receive and respond to the activating signal transmitted by the RFID transceiver. When the RFID tag is proximate the RFID transceiver, it detects the activation signal and sends its identifier to the RFID transceiver. The RFID transceiver receives and decodes the identifier, and passes the decoded data to a controller (e.g., content manager 34) for processing.

There are two types of RFID tags—passive and active. Passive RFID tags are typically capable of communicating with the RFID transceivers over distances between 10 millimeters and 5 meters. Thus, the RFID transceivers read the RFID tags when they are in close proximity to one another. Passive tags leverage the current induced in their antenna by the emitted activation signal to send their information to the RFID transceiver, and therefore, do not require their own power source. Active tags, on the other hand, may communicate their information to an RFID transceiver over larger distances. This capability may require active tags to have their own power source. In this embodiment, tag 42 comprises a passive tag. This permits a manufacturer to incorporate tag 42 into accessory 40, or attach tag 42 to one side of accessory 40. However, other embodiments may use active tags.

Figure 3:
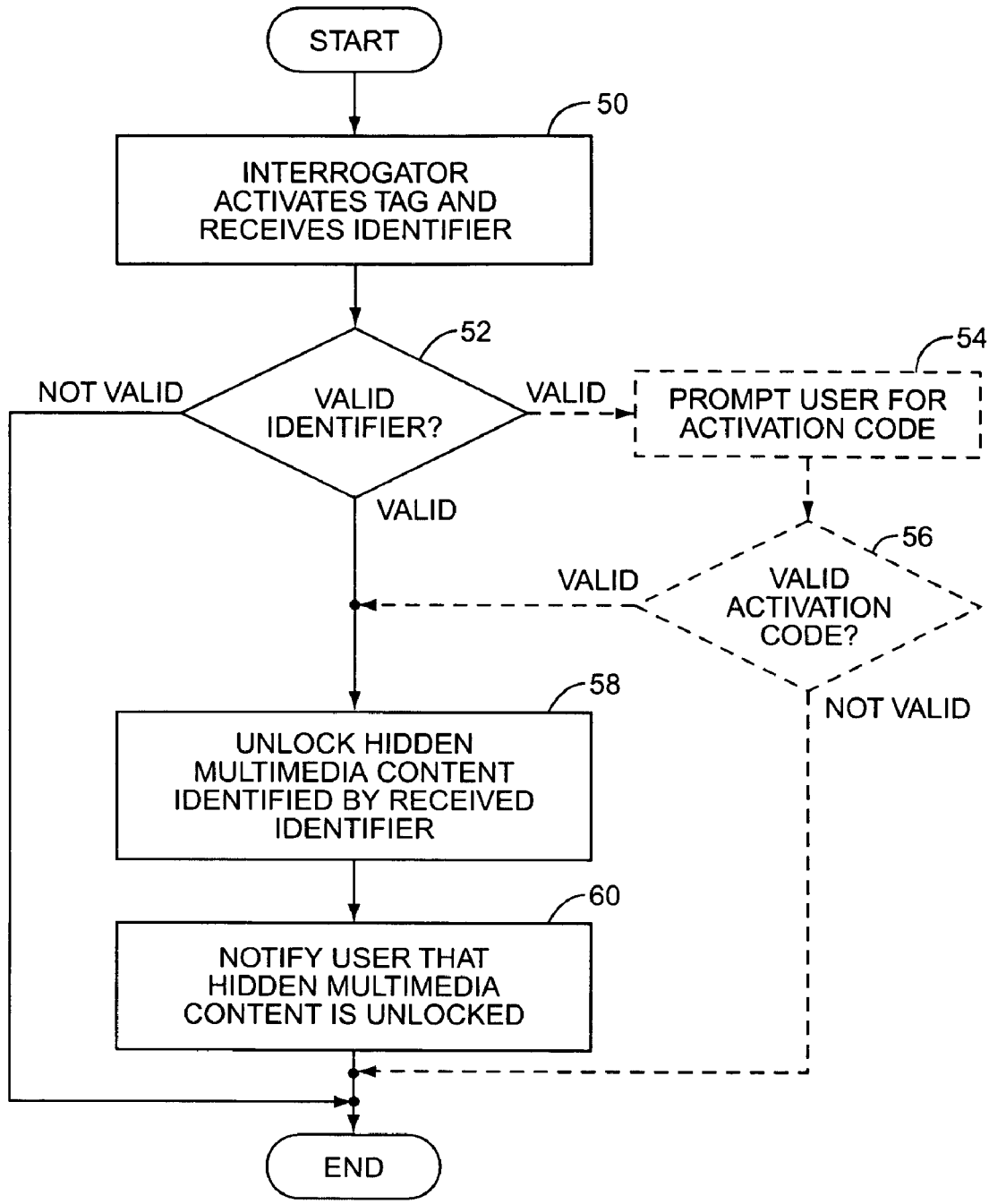
FIG. 3 illustrates a method of activating hidden multimedia content stored in a wireless communications device according to one embodiment of the present invention.

FIG. 3 illustrates a method according to one embodiment of the present invention wherein wireless communications device 20 (e.g., the cellular telephone of FIG. 1) uses an accessory (e.g., the cover of FIG. 1) to unlock hidden multimedia content 32 for the user. The accessory 40 includes an integrated tag 42 that contains a unique identifier. The identifier, which may or may not be encoded, identifies a particular hidden multimedia content 32 stored in memory 30.

When the user places accessory 40 in close proximity to wireless communications device 20 (e.g., when the user mates the cover to the cellular telephone), the activation signal from interrogator 36 activates tag 42 to send the identifier stored on tag 42 to interrogator 36 (box 50). Interrogator 36 then decodes the identifier, if necessary, and sends the identifier to content manager 34 for validation. Upon receipt, content manager 34 may validate the identifier by comparing it against a list of one or more known identifiers stored in memory 30, for example. In this embodiment, the list maps valid identifiers to the memory address or addresses at which the identified hidden multimedia content 32 resides.

If the identifier is valid (e.g., the comparison reveals a match) (box 52), content manager 34 retrieves the memory address associated with the identifier and unlocks or activates the identified hidden multimedia content 32 (box 58). Content manager 34 may then display a notice to the user informing the user that the hidden multimedia content 32 was unlocked (box 60). Because the content 32 is now unlocked, the user is free to use whatever multimedia content it contained regardless of whether the interrogator 36 proximate the tag 42. For example, if the hidden multimedia content 32 were a ring tone, the user could use the unlocked ring tone to signal an incoming call. The user need not maintain wireless communications device 20, and thus, interrogator 36, in close proximity of tag 42. Likewise, if the unlocked content included image or video data, the user would be free view the image or video data on display 28 at will. The user would also be free to invoke commands, applications, lighting schemes, and use settings or profiles once these were unlocked.

Thus, content manager 34 may validate the identifier against a list of identifiers stored in memory 30. However, in an alternate embodiment also shown in FIG. 3, content manager 34 may additionally use an activation code in concert with the identifier to activate hidden multimedia content 32. In this embodiment, the list also includes an activation code associated with each identifier in the list. Once content manager 34 has validated the received identifier, it may cause a prompt to be displayed to the user that prompts the user to enter an activation code (box 54). The activation code may be, for example, a secure Personal Identification Number (PIN) known only to the user and stored in memory 30. Alternatively, the activation code may be printed on product literature, downloaded to device 20 from a web site or communications network, or advertised commercially over the television or radio. However, the user may obtain one or more activation codes in any manner desirable. The user may enter the activation code using the user interface 22, and content manager 34 compares the activation code against those in the list. If the activation code is valid (box 56), content manager 34 unlocks the hidden multimedia content 32 (box 58), and may notify the user as previously described (box 60).

Figure 4:
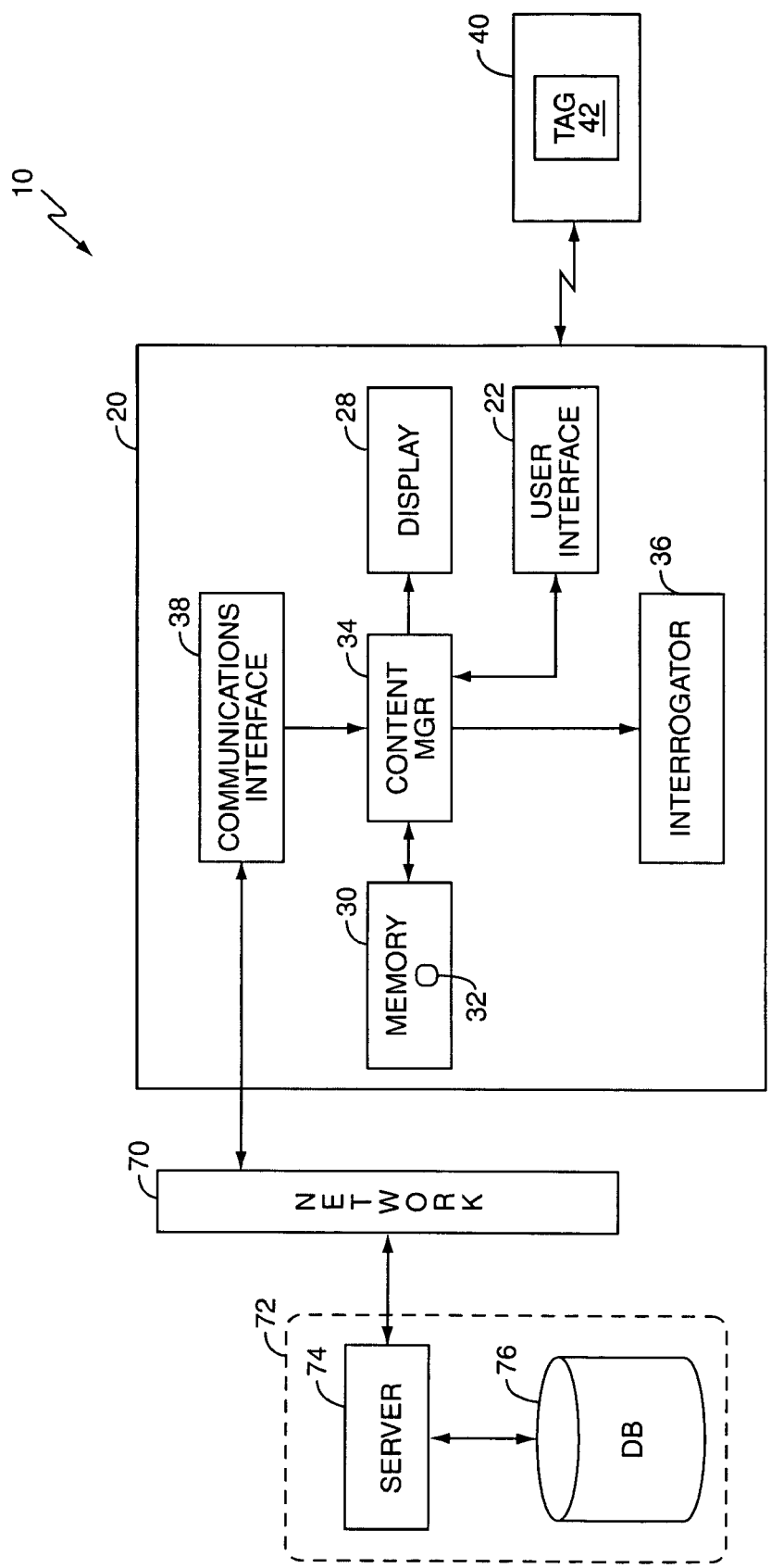
FIG. 4 illustrates a block diagram showing a wireless communications device and backend system according to an alternate embodiment of the present invention.
Figure 5:
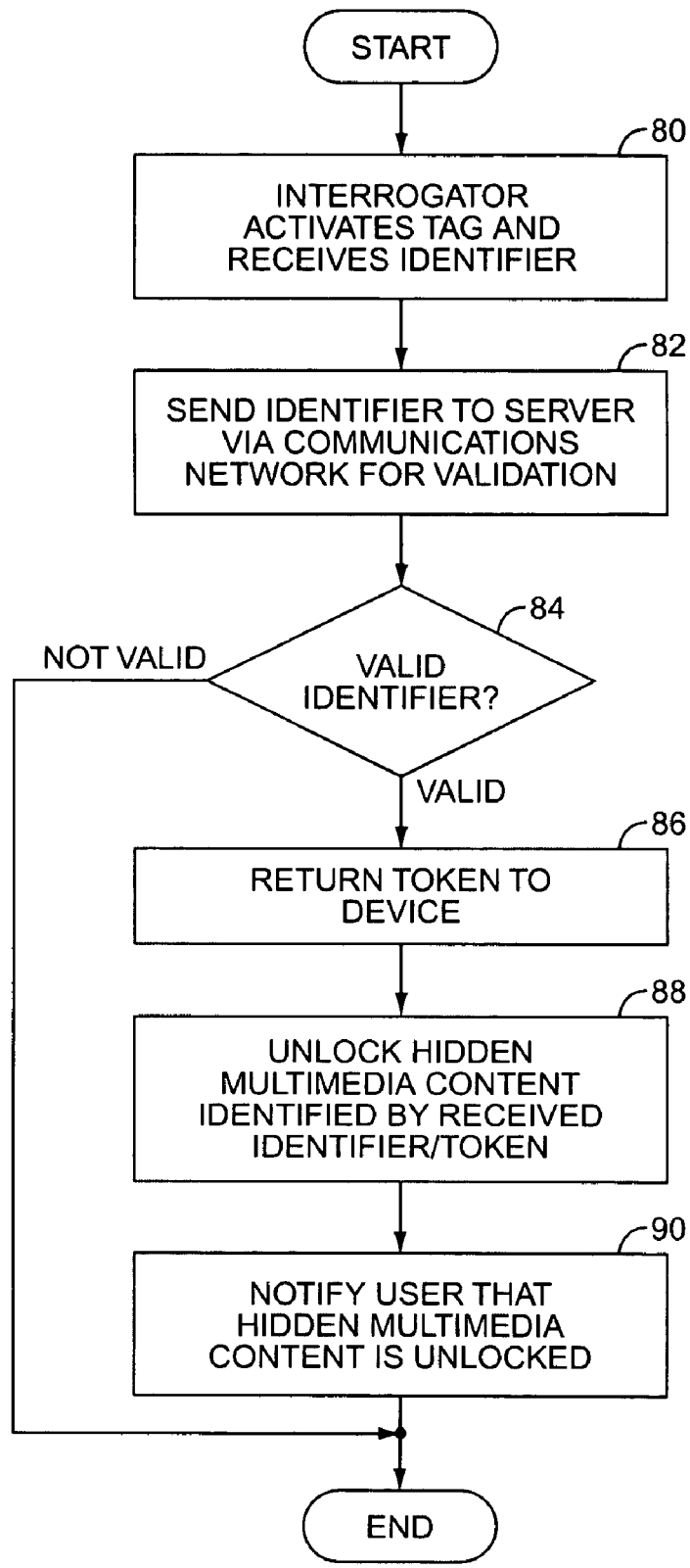
FIG. 5 illustrates a method of activating hidden multimedia content stored in a wireless communications device according to an alternate embodiment of the present invention.

In another embodiment, shown in FIGS. 4 and 5, wireless communications device 20 also includes a communications interface 38. Communications interface 32 may be, for example, a fully functional cellular radio transceiver that operates according to any known standard, including but not limited to Global System for Mobile Communications (GSM), TIA/EIA-136, cdmaOne, cdma2000, UMTS, and Wideband CDMA. Likewise, communications network 70 may be a wireless communications network that includes various entities such as base stations, mobile switching centers, and home/visitor location registers. Communications network 70 communicatively connects the wireless communications device 20 with a backend system 72 that includes a computing device, such as server 74, and a database 76 that stores the valid identifiers and other information used to unlock the hidden multimedia content 32. In this embodiment, the backend system 72 validates the identifier and returns a token to wireless communications device 20.

FIG. 5 shows a method that may be performed with the wireless communications device 20 of FIG. 4. Like the previous embodiment, the interrogator 36 emits a signal that activates tag 42 when accessory 40 and wireless communications device 20 are placed in close proximity to each other (box 80). Interrogator 36 sends the identifier to the content manager 34, which then sends the identifier to server 72 via communications network 70 (box 82). Server 72 looks up the identifier in database 76 to determine whether the identifier received from wireless communications device 20 is valid. If the identifier is valid (e.g., the identifier is found) (box 84), server 72 returns a token to wireless communications device 20 (box 86). Based on the identifier and/or token, content manager 34 unlocks the hidden multimedia content 32 (box 88), and may notify the user as previously described (box 90).

The token sent to wireless communications device 20 may be, for example, an activation code. Wireless communications device 20 could then use the activation code to activate the hidden multimedia content 32 as previously described. Alternatively, the token may simply be a "permission" flag in a return message or the return of the identifier itself. In these cases, the token acts as a permission slip that signals content manager 34 to activate the hidden multimedia content 32 using the information stored in memory 30. Whatever forms the token takes, content manager 34 unlocks the hidden multimedia content 32 based on the identifier and/or received token.

Figure 6:
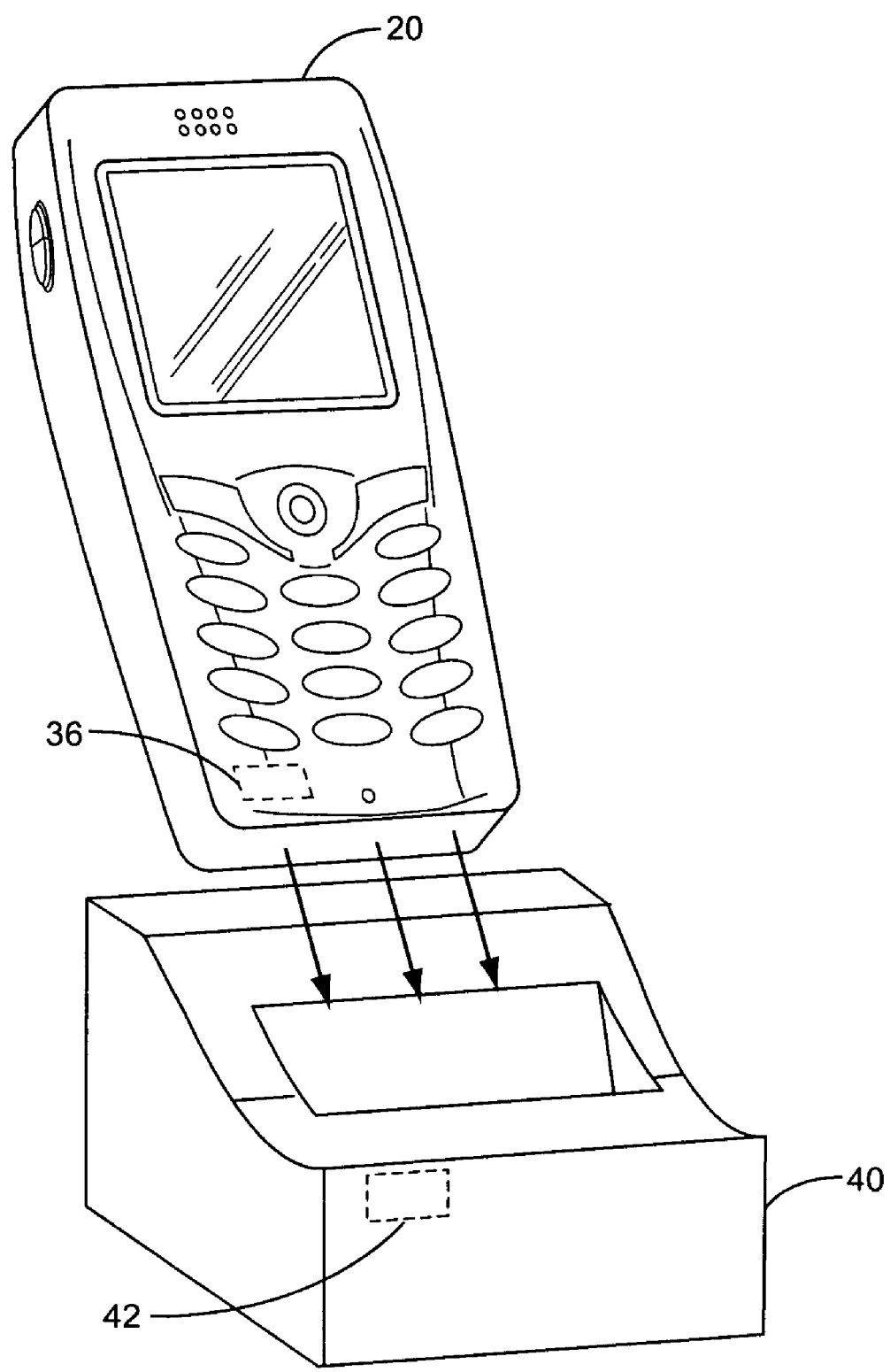
FIG. 6 illustrates an embodiment wherein the accessory is a charger that includes a tag to unlock hidden multimedia content according to one embodiment of the present invention.
Figure 7:
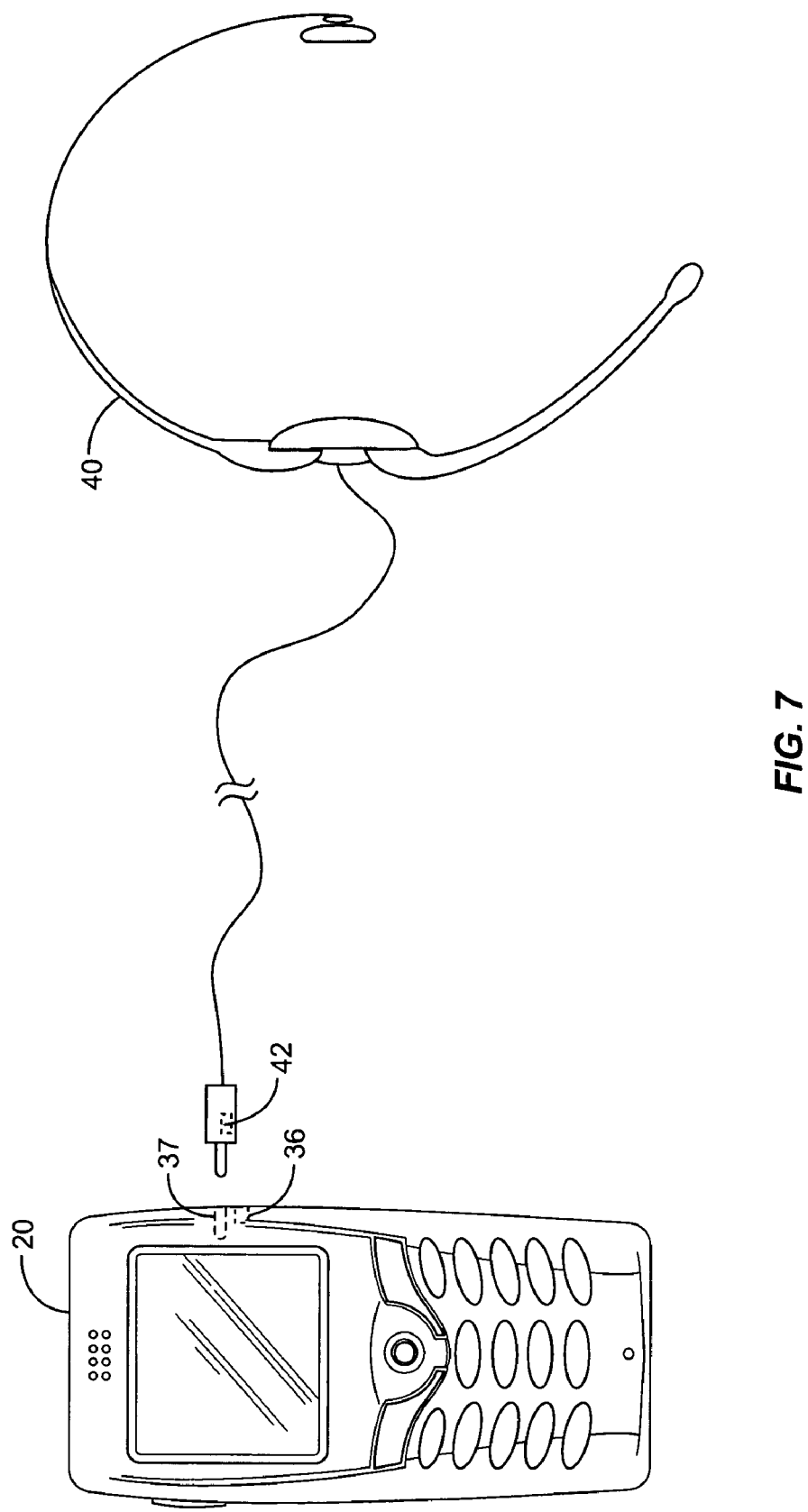
FIG. 7 illustrates an embodiment wherein the accessory is a hands-free headset that includes a tag to unlock hidden multimedia content according to one embodiment of the present invention.

As seen in FIGS. 6 and 7, tags associated with other accessory devices may be used to unlock the hidden multimedia content 32. FIG. 6, for example, illustrates one embodiment of accessory 40 as a charging unit. When the user places wireless communications device 20 into the charging unit, interrogator 36 activates and reads tag 42. Content manager 34 or backend system 72 may then validate the identifier as previously described. FIG. 7 illustrates accessory 40 as a hands-free headset. Like the other embodiments, interrogator 36 activates and reads the identifier from tag 42 when the hands-free headset mates with the wireless communications device 20. If the content manager 34 determines that the identifier is valid, content manager unlocks hidden multimedia content 32 as previously described.

Those skilled in the art will readily appreciate while the description and the Figures describe the present invention in terms of a cellular telephone and cover, any consumer electronics device using any type of accessory could use the present invention. For example, device 20 may be a PDA that does not have wireless communications ability. Network 70 might comprise the infrastructure necessary to connect the PDA to server 74 via a public or private IP network. The components that are included with these types of infrastructures are well known, and thus, not discussed here. In these cases, the content manager 34 may receive an identifier as previously described, and save it in memory 30. Later, when the user connects the PDA to the Internet via a home PC, for example, content manager 34 could send the stored identifier to server 74 via the Internet for validation.

In other embodiments, network 70 may comprise a short-range communications link that permits a short-range transceiver in device 20 to communicate with server 74. A corresponding short-range transceiver may, for example, be located in a store selling the accessories. Once a user has purchased the accessory, a short-range link may be established between the short-range transceiver in device 20 and the corresponding short-range transceiver located in the store to validate the identifier. The store's short-range transceiver may return a code to content manager 34 to identify and/or unlock the hidden multimedia content 32.

In still other embodiments, the tag 42 need not be associated with an accessory device at all. Instead, tag 42 may be placed in some conspicuous location, for example, on a wall or kiosk in a store. The user could enter the store, locate the tag 42, and place his or her consumer device in close proximity to tag 42. Interrogator 36 could read the tag, and content manager 34 could validate and unlock the hidden multimedia content 32 as previously described.

Accordingly, the present invention unlocks hidden multimedia content 32 based on the reception and validation of an identifier. However, the present invention is not limited solely to using a single identifier to unlock a single hidden multimedia content file, such as an audio file representing a ring tone. In alternate embodiments, a single identifier may be used to unlock a plurality of hidden multimedia content files. For example, a user may purchase accessory 40 having a design printed thereon that represents a theme related to a movie (e.g., a cover having a SPIDERMAN motif). When the user couples the cover to the phone, content manager 34 verifies the identifier as previously stated, and unlocks a ring tone having the SPIDERMAN theme song. Additionally, the content manager 34 may also unlock a SPIDERMAN screen saver, a SPIDERMAN game, and a lighting scheme or program that synchronizes the backlighting of the display and/or keypad to the SPIDERMAN ring tone and/or user interaction with the unlocked SPIDERMAN game. Alternatively, the tag 42 may comprise a plurality of identifiers, each of which identify the various SPIDERMAN hidden multimedia content files. As content manager 34 validates each identifier, it unlocks its identified content. Content manager 34 may unlock the identified hidden multimedia content 32 upon validation of the identifier, individually over a specified time, or in any combination thereof.

In addition, content manager 34 may delay unlocking some or all of hidden multimedia content 32 for a specified time. This would prevent users from simply entering a store, for example, and placing device 20 in close proximity to an accessory 40 to unlock the hidden multimedia content 32 without having to purchase accessory 40. The length of the timer is not important to the present invention; however, it is preferably of a value that is long enough to prevent a user from simply holding device 20 proximate accessory 40 for a short period of time.

Figure 8:
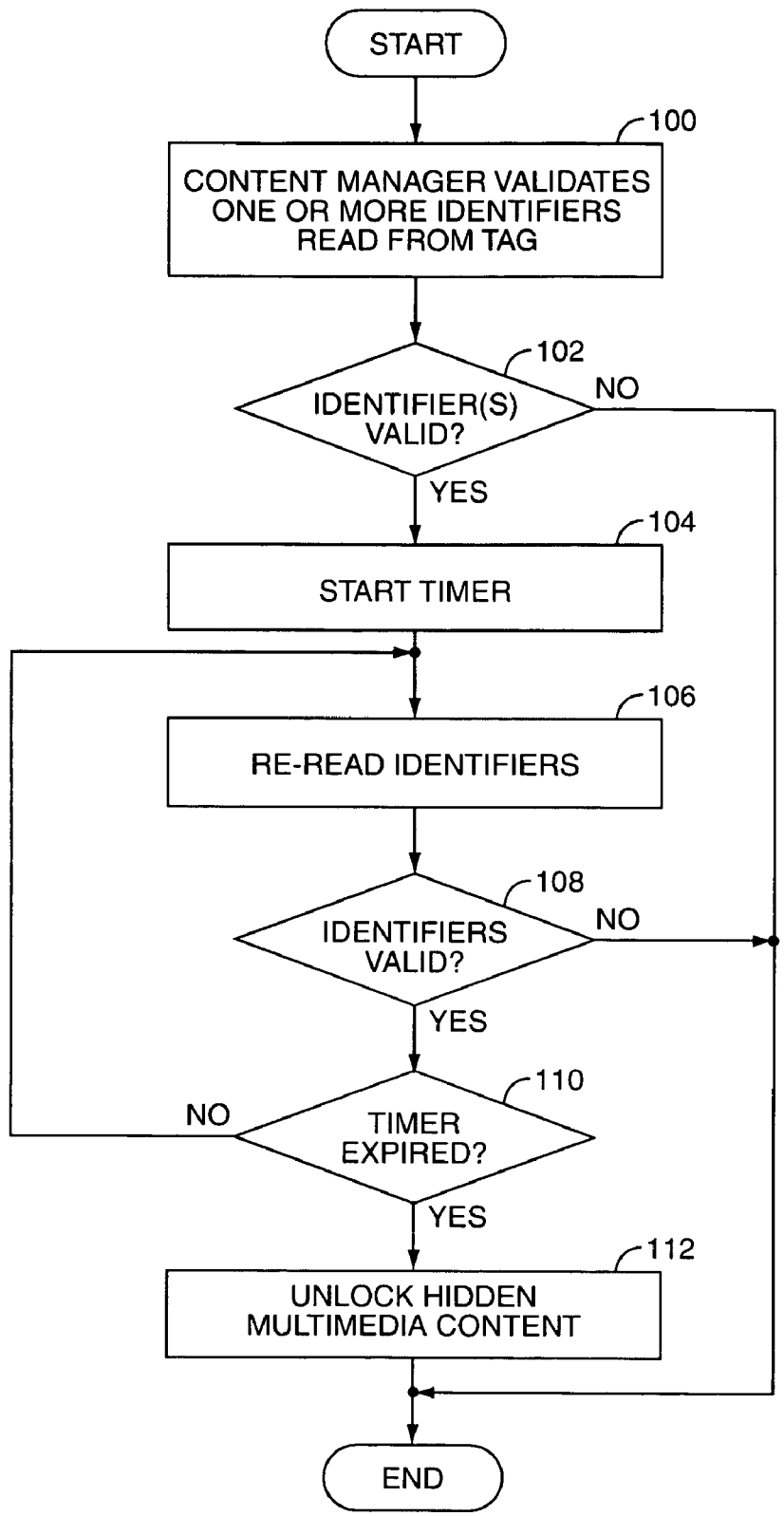
FIG. 8 illustrates an alternate embodiment wherein unlocking of the hidden multimedia content is delayed.

FIG. 8 shows one such embodiment in which a user purchases accessory 40 and couples or connects accessory 40 to device 20. Content manager 34 would validate the one or more identifiers as previously stated (box 100) and, if the identifier(s) were valid (box 102), would start a timer instead of unlocking the identified hidden multimedia content 32 (box 104). The timer could be set, for example, by the manufacturer and stored in the list of valid identifiers either on device 20 or system 72. Alternatively, interrogator 36 may read a timer value when it reads the one or more identifiers from tag 42. Periodically, the content manager 34 could generate a command to signal interrogator 36 to re-read the tag 42 (box 106). If the identifier(s) were no longer valid (e.g., device 20 is no longer proximate accessory 40 or the identifiers(s) have changed) (box 108), content manager 34 stops the timer and discards the identifier(s). The hidden multimedia content would remain locked. However, if the identifier(s) remain valid (box 108), the timer countdown continues. When the timer expires (box 110), content manager 34 would unlock the hidden multimedia content 32 for the user as previously described (box 112). Once unlocked, the user could access or use whatever content became unlocked regardless of whether the device 20 was in close proximity to accessory 40.

Likewise, a similar security feature may be imposed on users to prevent users from sharing a single accessory 40. In this embodiment, database 76 in system 72 may store an indicator that flags an identifier as having already been activated by a purchasing user. Subsequent requests to unlock the hidden multimedia content 32 based on these marked-identifiers could then be refused.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A consumer electronics device comprising:
   memory to store hidden multimedia content;
   an interrogator to receive an identifier, from a proximate external device, that identifies the hidden multimedia content; and
   a content manager communicatively connected to the memory and the interrogator, and configured to:
   initiate a timer when the interrogator receives the identifier; and
   unlock the hidden multimedia content when the timer expires if the external device remains in proximity to the consumer electronics device when the timer expires.

2. The device of claim 1 wherein the interrogator receives the identifier responsive to an activation signal emitted by the interrogator.

3. The device of claim 1 wherein the identifier is associated with an accessory device for the wireless communications device.

4. The device of claim 3 wherein the identifier is a unique identity code stored on a radio frequency identification tag associated with the accessory device, and wherein the identifier identifies the hidden multimedia content stored in memory of the consumer electronics device.

5. The device of claim 1 wherein the content manager validates the identifier, and unlocks the hidden multimedia content if the identifier is valid.

6. The device of claim 1 further comprising a transceiver to transmit the identifier for validation to a server via a communications network.

7. The device of claim 6 wherein the content manager unlocks the hidden multimedia content based on a token returned by the server.

8. The device of claim 1 wherein the content manager displays a message that notifies a user that the hidden multimedia content is unlocked.

9. The device of claim 1 wherein the content manager unlocks the hidden multimedia content based on the identifier and an activation code entered by the user.

10. The device of claim 1 wherein the content manager generates a command signal to cause the interrogator to periodically re-read the identifier before the timer expires, and wherein the content manager validates the periodically re-read identifier.

11. The device of claim 1 wherein the consumer electronics device comprises a mobile phone.

12. A method of unlocking hidden multimedia content in a consumer electronics device, the method comprising:
   storing hidden multimedia content in memory of a consumer electronics device;
   receiving an identifier, from a proximate external device, that identifies the hidden multimedia content;
   initiating a timer when the identifier is received; and
   unlocking the hidden multimedia content when the timer expires if the external device remains in proximity to the consumer electronics device when the timer expires.

13. The method of claim 12 wherein receiving the identifier comprises receiving the identifier responsive to an activation signal transmitted by the consumer electronics device.

14. The method of claim 12 wherein the identifier comprises a unique identifier assigned to a radio frequency identification tag associated with an accessory device, and uniquely identifies the hidden multimedia content stored in memory of the consumer electronics device.

15. The method of claim 12 further comprising transmitting the identifier to a server for validation via a communications network.

16. The method of claim 15 further comprising unlocking the hidden multimedia content based on a token returned to the consumer electronics device by the server.

17. The method of claim 12 further comprising unlocking the hidden multimedia content if the received identifier is valid.

18. The method of claim 12 further comprising displaying a message to notify a user that the hidden multimedia content has been unlocked.

19. The method of claim 12 further comprising unlocking the hidden multimedia content based on the identifier and an activation code entered by the user.

20. The method of claim 12 further comprising periodically receiving the identifier, and re-validating the identifier while the timer has not expired.

21. A system for unlocking hidden multimedia content in a consumer electronics device, the system comprising:
a first member to store an identifier that identifies hidden multimedia content stored in memory of a wireless communications device;
a proximate second member to receive the identifier from the first member responsive to an activation signal emitted by the consumer electronics device; and
a content manager configured to:
initiate a timer when the second member receives the identifier; and
unlock the hidden multimedia content when the timer expires if the first member remains in proximity to the consumer electronics device when the timer expires.

22. The system of claim 21 wherein the first member is associated with an accessory for the consumer electronics device, and the second member is associated with the consumer electronics device.

23. The system of claim 22 wherein the first member comprises a radio frequency identification tag, and the second member comprises a radio frequency interrogator to read the tag.

24. The system of claim 21 wherein the content manager unlocks the hidden multimedia content if the received identifier is valid.

25. The system of claim 21 wherein the consumer electronics device comprises a transceiver to transmit the received identifier to a server via a communications network.

26. The system of claim 25 wherein the server validates the identifier received from the consumer electronics device, and returns a token to the consumer electronics device based on the validation of the identifier.

27. The system of claim 26 wherein the content manager unlocks the hidden multimedia content based on the token received from the server.

28. The system of claim 21 wherein the content manager prompts the user to enter an activation code, and unlocks the hidden multimedia content based on the identifier and the activation code entered by the user.

* * * * *